Sept. 20, 1966

D. L. BURNER 3,273,932

FISHING TOOL

Filed July 6, 1964

DONALD L. BURNER
*INVENTOR.*

BY

Robert K. Rhea
AGENT

DONALD L. BURNER
INVENTOR.

BY

Robert K. Rhea
AGENT 3,273,932

FISHING TOOL

Donald L. Burner, Norman, Okla., assignor to Acme Tool, Inc., Oklahoma City, Okla., a corporation of Kansas Filed July 6, 1964, Ser. No. 380,469
3 Claims. (Cl. 294—86.33)

The present invention relates to oil well fishing tools and more particularly to a drill collar weights fishing tool.

A rotary drilling system is sometimes employed for drilling relatively large diameter boreholes five feet or more in diameter. In rotary drilling it is necessary to use drill collars to apply sufficient load to the bit. Drill collars, as used in big hole drilling, are usually formed of lead weights coaxially positioned in layers about a central fluid conducting tube. The top to bottom thickness of each individual weight is considerably less than its diameter thus giving the weights a wafer or disk-like appearance. Since the drill collar weights supporting tubes are under compression they are subject to fatigue failure thus resulting in the necessity of fishing the drill collar weights and drill bit out of the hole. Because of their relatively large size conventional fishing tools are not adaptable for use in fishing drill collar weights when lost in the hole.

It is, therefore, the principal object of the present invention to provide a fishing tool which will engage and grip drill collar weights lost in a borehole.

Another object is to provide a fishing tool which may be coaxially positioned around a plurality of stacked drill collar weights and remove such plurality of weights by gripping the lowermost weight.

Still another object is to provide a fishing tool which is tubular in overall appearance and having a series of hardened teeth formed on its lowermost edge surface which will perform a milling action when rotated.

Yet another object is to provide a fishing tool having retractable fish engaging members which will automatically engage and grip a drill collar weight when placed in position therewith.

The present invention accomplishes these and other objects by providing an elongated casing having means at its upper end for connection with a fishing string and which is provided at its depending end with means for surrounding and gripping one or more drill collar lead weights.

Other objects will be apparent from the following description when taken in conjunction with the accompanying two sheets of drawings, wherein.

Like characters of reference designate like parts in those figures of the drawings in which they occur.

In the drawings.

Figure 2:
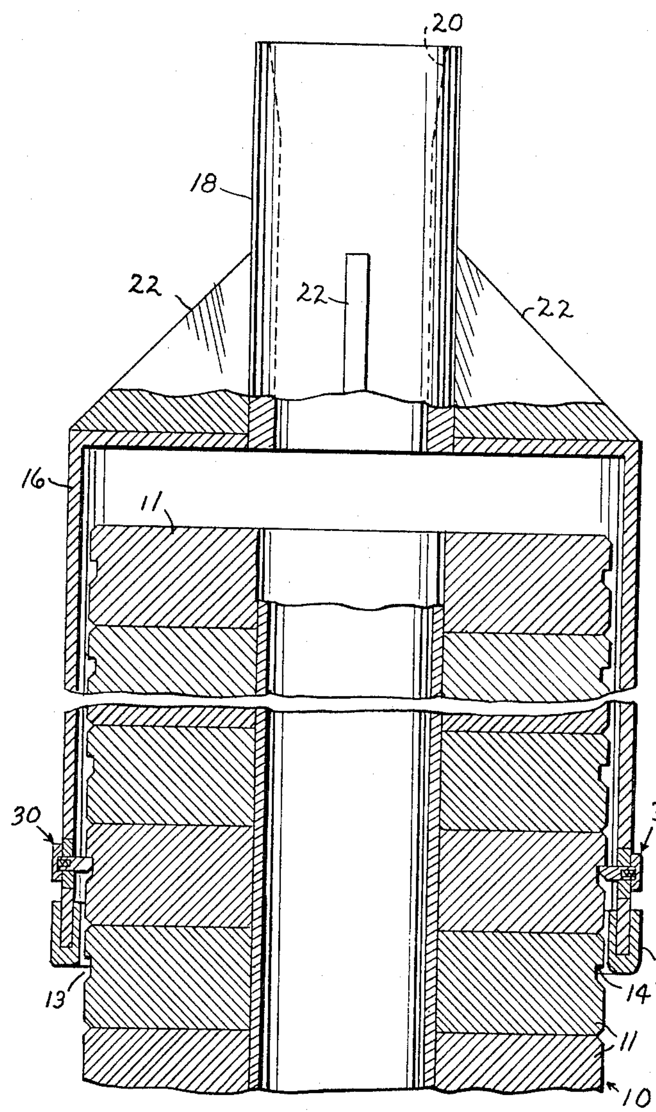
FIGURE 2 is a vertical cross-sectional view, partially in elevation, taken substantially along the line 2—2 of FIG. 1.

The reference numeral 10 indicates, as a whole, a fragment of a drill collar comprising a series of disk-like lead weights 11 coaxially surrounding, in superposed relation, a central tube 12. Intermediate its upper and lower surfaces each of the weights 11 is conventionally provided with a circumferential recess 13 forming an annular shoulder 14.

Figure 1:
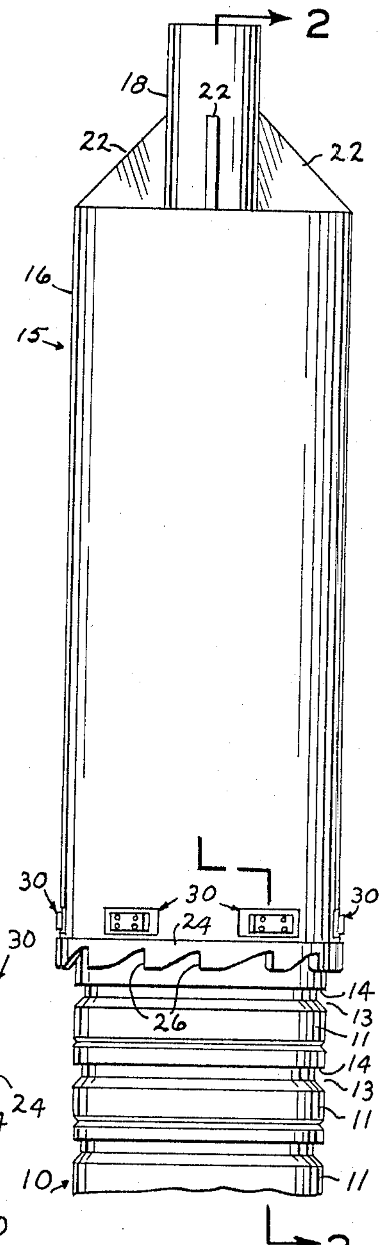
FIGURE 1 is an elevational view of the fishing tool positioned over a column of drill collar weights.

The numeral 15 indicates the fishing tool, as a whole, which is cylindrical in general configuration. The tool 15 comprises a casing 16 diametrically great enough to loosely surround coaxially the drill collar 10. The length of the casing 16 is preferably such that a plurality of the weights 11 may be received therein. The upper closed end portion of the casing 16, as viewed in FIG. 1, is centrally drilled and coaxially connected with a tubular member 18 threaded at its upper end, as at 20, for connection with a fishing string, not shown. Reinforcing gussets 22 support the tube 18 against lateral movement with respect to the casing 16. The depending end surface of the casing is shaped to form a series of teeth 26 and provided with a coating of hardened material 24 welded to the adjacent outer and inner wall surfaces and depending edge surface of the casing 16 for the purposes which will presently be explained.

Adjacent its depending end and upwardly of the material 24, the casing 16 is provided with a plurality of circumferentially spaced-apart grip members 30. The grip members 30 each comprise a central body portion 32 somewhat rectangular in general configuration but formed on an arc to coincide, respectively, with the arc of the inner and outer periphery of the casing 16. Each body member 32 is snugly received and secured with suitable apertures 34 formed in the wall of the casing 16. A gripping lug or finger 36 is slidably received within a suitable aperture 38 formed in each body member 32.

Figures 3, 4:
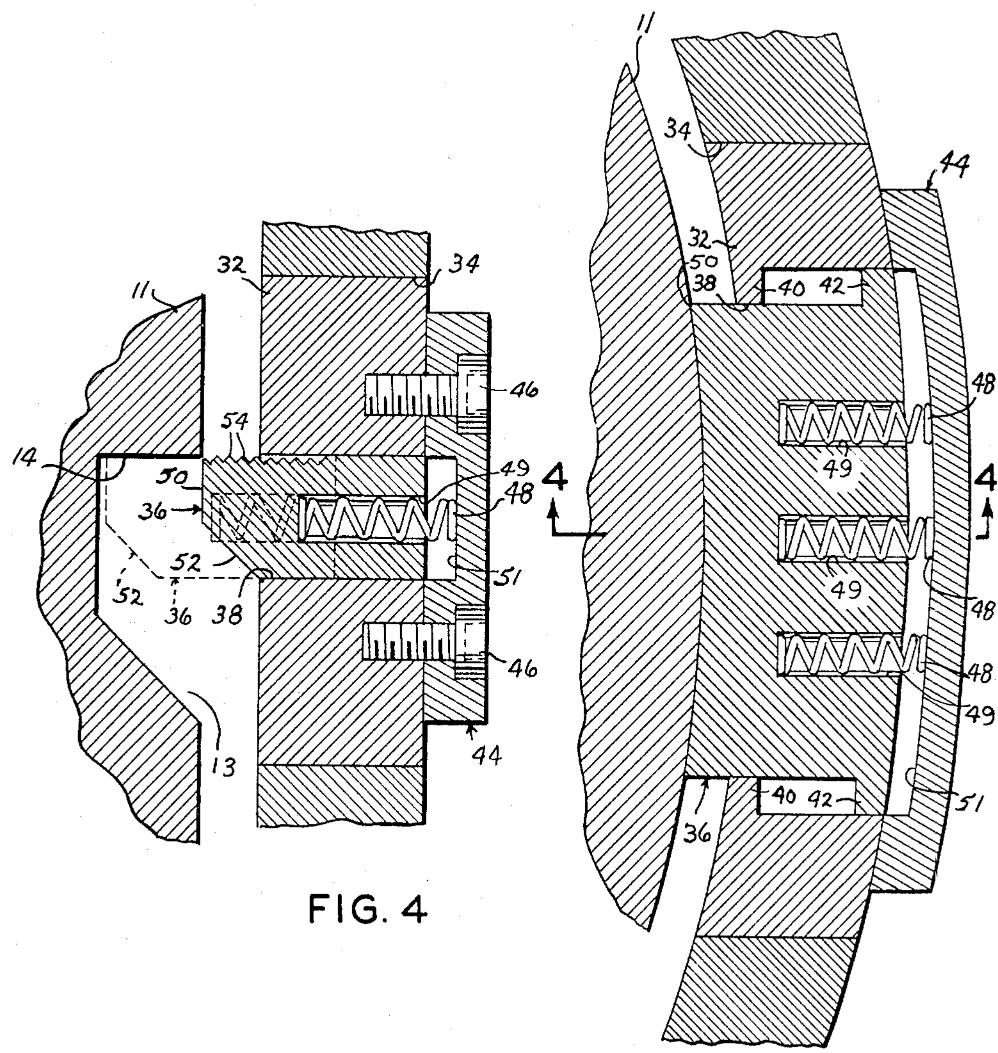
FIGURE 3 is a fragmentary horizontal cross-sectional view.
FIGURE 4 is a vertical cross-sectional view taken substantially along the line 4—4 of FIG. 3.

As shown in FIG. 3, the aperture 38 is counterbored or enlarged to form opposing annular shoulders 40. Each finger 36 is provided with a laterally extending flange 42 which acts as a stop and prevents the respective finger moving out of the body member 32 toward the center of the casing 16. Outward movement of the finger 36 is limited by a guard or shield 44 secured to the body 32 in concentric relation with respect to the casing 16 by bolts or screws 46. A plurality of helical springs 48 are nested at one end portion by suitable sockets 49 formed in the fingers 36 and at their other end against an inner surface of a recess 51 formed in the shield 44. The springs 48 normally urge the fingers inwardly of the body 32 and the casing 16. The inwardly directed end surface 50 of each of the fingers 36 is formed on an arc complemental with respect to the circumference of the weights 11 and is further provided with an upwardly inclined beveled surface 52, as seen in FIG. 4, for the purposes which will presently be explained.

Adjacent its inwardly directed end surface 50 the upper surface, as viewed in FIG. 4, of each finger 36 is provided with a series of teeth preferably lefthand threads 54 for the purposes to be explained.

OPERATION

In operation the tool 15 is lowered into the borehole, not shown, and circulated or washed down over the upper end of the lost drill collar 10. During this operation the casing 16 may be rotated to the right as is conventional for removing cuttings, earth formation or truing up the uppermost one or ones of the drill collar weights 11 so that the casing 16 may coaxially receive a plurality of the latter therein. During the downward movement of the tool the beveled surfaces 52 of the fingers 36 contact the upper outer edge surfaces of the weights 11 and forces the fingers 36 radially outward within the body members 32 so that the fingers will ride or slide downwardly beyond a plurality of the superposed weights. When the uppermost weight reaches the upper limit of the casing 16, or when downward movement of the device is stopped for any reason, the device 15 is lifted and rotated toward the right so that the fingers 36 are forced radially inwardly by the springs 48 and complementary enter the annular recesses 13 of one of the weights. Simultaneously the lefthand threads 54 progressively move the fingers 36, in combination with the springs 48, into firm gripping relation with the shoulder surface 14 of the particular groove 13. Thereafter the tool 15 and drill weights 11 therein may be removed from the hole in a conventional manner.

If for any reason it is desired to release the fingers from gripping contact with the engaged drill collar segment, the tool 15 may be rotated in a counterclockwise direction which progressively retracts the fingers 36 by means of the lefthand threads 54.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A fishing tool for drill collar weights, including: an elongated casing adapted to be lowered into a borehole, and encompass a column of drill collar weights, said casing having a series of teeth formed on its lower end; and a plurality of gripping members slidably positioned in circumferential spaced relation within the wall of said casing adjacent its lower toothed end, said gripping members comprising a body member secured within the wall of said casing, said body member having an aperture therein, a finger slidably received by the aperture in said body member and projecting inwardly of the inner wall surface of said casing, a shield secured to the outwardly disposed surface of said body member in overlapping relation with respect to the aperture therein, and a spring interposed between said shield and said finger and normally urging the latter inwardly of said casing into drill collar contacting and gripping position.

2. Structure as specified in claim 1 in which the upper surface of said finger is provided with a series of teeth adapted for engaging a drill collar weight and moving said finger inwardly of said casing.

3. A fishing tool for drill collar weights, including: an elongated casing adapted to be lowered into a borehole and encompass a column of drill collar weights; a plurality of expandable and retractable gripping members secured in circumferential spaced relation within the wall of said casing adjacent its depending end, said gripping members comprising a body member having outer and inner surfaces coincident, with respect to the respective outer and inner peripheries of said casing, said body member having an aperture counterbored to form opposing shoulders; a finger positioned within each aperture for horizontal sliding movement, said finger normally projecting inwardly of the inner periphery of said casing, said finger having opposing flanges coacting with said shoulders to form a stop limiting the inward sliding movement of said finger; a shield concentrically secured to the outer surface of said body member and covering the aperture therein, said finger having at least one socket open toward said shield; and a spring with the socket in said finger and bearing against said shield.

References Cited by the Examiner

UNITED STATES PATENTS

| | | | |
|---|---|---|---|
| 1,599,067 | 9/1926 | Segelhorst | 294—86.33 X |
| 1,628,042 | 5/1927 | Gates | 294—86.33 X |
| 3,174,548 | 3/1965 | Webb | 166—237 X |

GERALD M. FORLENZA, *Primary Examiner.*

G. F. ABRAHAM, *Assistant Examiner.*